(12) United States Patent
Hayakawa

(10) Patent No.: US 8,369,502 B2
(45) Date of Patent: Feb. 5, 2013

(54) COMMUNICATIONS SYSTEM, PRESENCE SERVER, AND COMMUNICATIONS METHOD USED FOR THEM

(75) Inventor: Yoshiaki Hayakawa, Tokyo (JP)

(73) Assignee: NEC Infrontia Corporation, Kanagawa (JP)

( * ) Notice: Subject to any disclaimer, the term of this patent is extended or adjusted under 35 U.S.C. 154(b) by 919 days.

(21) Appl. No.: 11/531,049

(22) Filed: Sep. 12, 2006

(65) Prior Publication Data

US 2007/0060096 A1 Mar. 15, 2007

(30) Foreign Application Priority Data

Sep. 14, 2005 (JP) ................................. 2005-266176

(51) Int. Cl.
*H04M 1/00* (2006.01)
(52) U.S. Cl. .................. 379/157; 379/161; 379/201.01; 709/228; 709/240; 370/252; 370/282
(58) Field of Classification Search .................. 455/417, 455/403; 379/211.01, 211.02, 212.01, 157, 379/161, 201.01; 709/240, 248; 370/282, 370/252

See application file for complete search history.

(56) References Cited

U.S. PATENT DOCUMENTS

| | | | | |
|---|---|---|---|---|
| 6,005,870 A * | 12/1999 | Leung et al. | .................. | 370/466 |
| 6,205,135 B1 * | 3/2001 | Chinni et al. | .................. | 370/356 |
| 7,317,716 B1 * | 1/2008 | Boni et al. | .................. | 370/352 |
| 7,571,249 B2 * | 8/2009 | Wu | .................. | 709/238 |
| 2002/0085701 A1 * | 7/2002 | Parsons et al. | .................. | 379/211.01 |
| 2003/0041048 A1 * | 2/2003 | Balasuriya | .................. | 707/1 |
| 2003/0177220 A1 * | 9/2003 | Ohara | .................. | 709/223 |
| 2006/0072715 A1 * | 4/2006 | Michael et al. | .................. | 379/88.12 |
| 2006/0146997 A1 * | 7/2006 | Qian et al. | .................. | 379/88.16 |
| 2006/0239186 A1 * | 10/2006 | Wu | .................. | 370/229 |
| 2007/0041401 A1 * | 2/2007 | Kaneda et al. | .................. | 370/468 |
| 2007/0253340 A1 * | 11/2007 | Varney et al. | .................. | 370/252 |

FOREIGN PATENT DOCUMENTS

| | | |
|---|---|---|
| JP | 63-301658 | 12/1988 |
| JP | 4-304759 | 10/1992 |
| JP | 5-316234 | 11/1993 |
| JP | 6-62124 | 3/1994 |
| JP | 6-121046 | 6/1994 |
| JP | 10-75299 | 3/1998 |
| JP | 10-224474 | 8/1998 |
| JP | 2002-14923 | 1/2002 |
| JP | 2004-229296 | 8/2004 |
| JP | 2004-242090 | 8/2004 |
| JP | 2004-357217 | 12/2004 |
| JP | 2005-18194 | 1/2005 |
| JP | 2005-167940 | 6/2005 |
| WO | WO 2004/095816 | 11/2004 |
| WO | WO 2005-074216 | 8/2005 |

OTHER PUBLICATIONS

Japanese Office Action with English Translation.
Japanese Office Action with English translations.

* cited by examiner

Primary Examiner — Rafael Pérez-Gutiérrez
Assistant Examiner — Allahyar Kasraian
(74) Attorney, Agent, or Firm — Whitham Curtis Christofferson & Cook, PC

(57) ABSTRACT

The present invention provides a communications system, presence server, and communications method used for them, which determines an optimum operation for phone call taken into account presence information of caller. The presence server compares a priority level allocated to caller presence information with a priority level allocated to receiver presence information, selects optimum operation from preset operations based on the comparison result and controls a exchange according to the selected operation.

18 Claims, 6 Drawing Sheets

| USER ID | PASSWORD | PRESENCE | PRIORITY LEVEL | RECEIVER-PRIORITY ACTION | CALLER-PRIORITY ACTION |
|---|---|---|---|---|---|
| 1001 | 1001 | ATTENDED | 1 | RECEPTION | RECEPTION |
| | | ABSENT | 2 | NOTIFICATION OF ABSENT USING IM | FORWARDING TO HANDY PHONE TERMINAL 6-1 |
| | | MEETING | 3 | ANNOUNCEMENT OF BEING MEETING | RECEPTION |
| | | BUSY BY FULL SCHEDULE | 5 | FORWARDING TO TELEPHONE ANSWERING SERVICE | RECEPTION |
| 1002 | 1002 | ATTENDED | 1 | RECEPTION | RECEPTION |
| | | MEETING | 3 | FORWARDING TO TELEPHONE ANSWERING SERVICE | FORWARDING TO HANDY PHONE TERMINAL 6-2 |
| | | HOME | 5 | FORWARDING TO TELEPHONE ANSWERING SERVICE | FORWARDING TO HOME PHONE |
| | | LINE BUSY | 6 | FORWARDING TO TELEPHONE ANSWERING SERVICE | CALL WAITING |
| ⋮ | ⋮ | ⋮ | ⋮ | ⋮ | ⋮ |

| USER ID | PASSWORD | PRESENCE | PRIORITY LEVEL | RECEIVER-PRIORITY ACTION | CALLER-PRIORITY ACTION |
|---|---|---|---|---|---|
| 1001 | 1001 | ATTENDED | 1 | RECEPTION | RECEPTION |
| | | ABSENT | 2 | NOTIFICATION OF ABSENT USING IM | FORWARDING TO HANDY PHONE TERMINAL 6-1 |
| | | MEETING | 3 | ANNOUNCEMENT OF BEING MEETING | RECEPTION |
| | | BUSY BY FULL SCHEDULE | 5 | FORWARDING TO TELEPHONE ANSWERING SERVICE | RECEPTION |
| 1002 | 1002 | ATTENDED | 1 | RECEPTION | RECEPTION |
| | | MEETING | 3 | FORWARDING TO TELEPHONE ANSWERING SERVICE | FORWARDING TO HANDY PHONE TERMINAL 6-2 |
| | | HOME | 5 | FORWARDING TO TELEPHONE ANSWERING SERVICE | FORWARDING TO HOME PHONE |
| | | LINE BUSY | 6 | FORWARDING TO TELEPHONE ANSWERING SERVICE | CALL WAITING |
| ... | ... | ... | ... | ... | ... |

FIG.3

COMMUNICATIONS SYSTEM, PRESENCE SERVER, AND COMMUNICATIONS METHOD USED FOR THEM

BACKGROUND OF THE INVENTION

1. Field of the Invention

The present invention relates to a communications system, a presence server and a communications method used for them. Particularly, the present invention relates to a method for forwarding an incoming call to a user according to user presence information.

2. Description of the Related Art

In a conventional Private Branch exchange (PBX), when a user who uses a terminal accommodated in a PBX as one of extension lines uses a call forwarding function of the PBX, the user needs to preset a forwarding destination in the PBX and perform an operation to enable a forwarding state (for example, see Japanese Patent Laid-Open No. 5-316234). Japanese Patent Laid-Open No. 2002-014923 proposes the technology for switching an operation of PBX to automatically forward an incoming call without preset of PBX by a telephone user. In the technology proposed by Japanese Patent Laid-Open No. 2002-014923, a presence monitoring system monitors the presence or absence of user operation of a personal computer (PC) used by a user on desktop. If a user has not operated the computer for a long time, the presence monitoring system determines that the user is absent from one's desk and sends a signal to the PBX to switch an incoming call to the user's telephone from a normal operation to a forwarding state for forwarding it to preset telephone set. Thereby, automatic switching to a forwarding state is achieved without a user operation of PBX.

In Japanese Patent Laid-Open No. 63-301658 and Japanese Patent Laid-Open No. 6-121046, additional technologies about forwarding are proposed. In the technology disclosed in these documents, if a call arrives at an unattended telephone, a PBX memorizes telephone numbers of a caller and a receiver, and calls and connects telephones of the both parties at another time when the both parties are present.

In some of the proposed technologies mentioned above, though switching between on and off of forwarding is automatic, a forwarding destination is fixed. Japanese Patent Laid-Open No. 2005-018194 proposes a technology for dynamically changing of a forwarding destination. In this technology, a PBX retains a user presence status table which indicates user presence (user status) and a per-user forwarding destination table in which a forwarding destination is set depending on user presence in the memory. When a call arrives at a user, the PBX obtains presence of the user from the user presence status table. The PBX obtains a forwarding destination corresponding to the obtained presence from the per-user forwarding destination table, and thereby switches a forwarding destination dynamically.

By the technology proposed by Japanese Patent Laid-Open No. 2005-018194, a forwarding destination can be dynamically changed depending on user presence. However, in this technology, information used for changing a forwarding destination by a PBX is only receiver's presence information. The PBX does not use information of caller side. Thus, in the technology disclosed in Japanese Patent Laid-Open No. 2005-018194, while a forwarding destination and a receiving action can be changed depending on presence of a receiver, there is a problem that a forwarding destination and a receiving action can not be changed depending on situation of a caller.

In particular, even if a caller wants to contact with a receiver urgently, a PBX performs a preset action corresponding to only a receiver's presence without considering a situation of the caller. For example, when, according to a user setting, a prerecorded message is set to be used as a response to an incoming call in presence situation such as when a user is in a meeting or traveling, the PBX responds to the incoming call to a user in such a situation by playing the prerecorded message in the same way even if a caller is in any situation.

In recent years, there are more and more systems in which a PBX accommodates a mobile telephone using a wireless communications system in addition to a desk telephone. A mobile telephone allows a user to call even if the user is away from one's desk. In such a system, a user can operates a mobile telephone to switch an action for reception to a call hold, forwarding, or the like. However, also in this case, a function of PBX which a user can switch is only a receiving action which supports a receiver's convenience but does not identify a situation of a caller.

SUMMARY OF THE INVENTION

The present invention is made to solve the above described problems in view of the above described circumstances, and intends to provide a communications system, presence server, and a communications method used for them, which can determine an optimum call processing adapted to both presence information of a caller and a receiver in consideration of a caller situation and a receiver situation.

A communications system according to the present invention, a plurality of communication terminals, a PBX and a presence sever are connected to a network. The PBX performs call connection processing for the communication terminal. The presence server maintains presence information that indicates a presence status set to each communication terminal, and extracts control information of the PBX based on both presence information corresponding to a caller side communication terminal and receiver side communication terminal when instructed by the PBX. Therefore, when an incoming call to the communication terminal is performed, the PBX instructs the presence server to obtain the control information and performs different call connection processing depending on the control information obtained by the presence server.

According to the present invention, the presence server uses not only the receiver's presence information but also the caller's presence information so that the presence server determines the optimum call processing for the PBX taking the caller's situation into account.

BRIEF DESCRIPTION OF THE DRAWINGS

The above and other purposes, features and advantages of the present invention will be more apparent from the following detailed description when taken in conjunction with the accompanying drawings wherein:

FIG. 3 is a configuration of a database according to an embodiment of the present invention;

DETAILED DESCRIPTION OF THE EXEMPLARY ASPECTS

Figure 1:
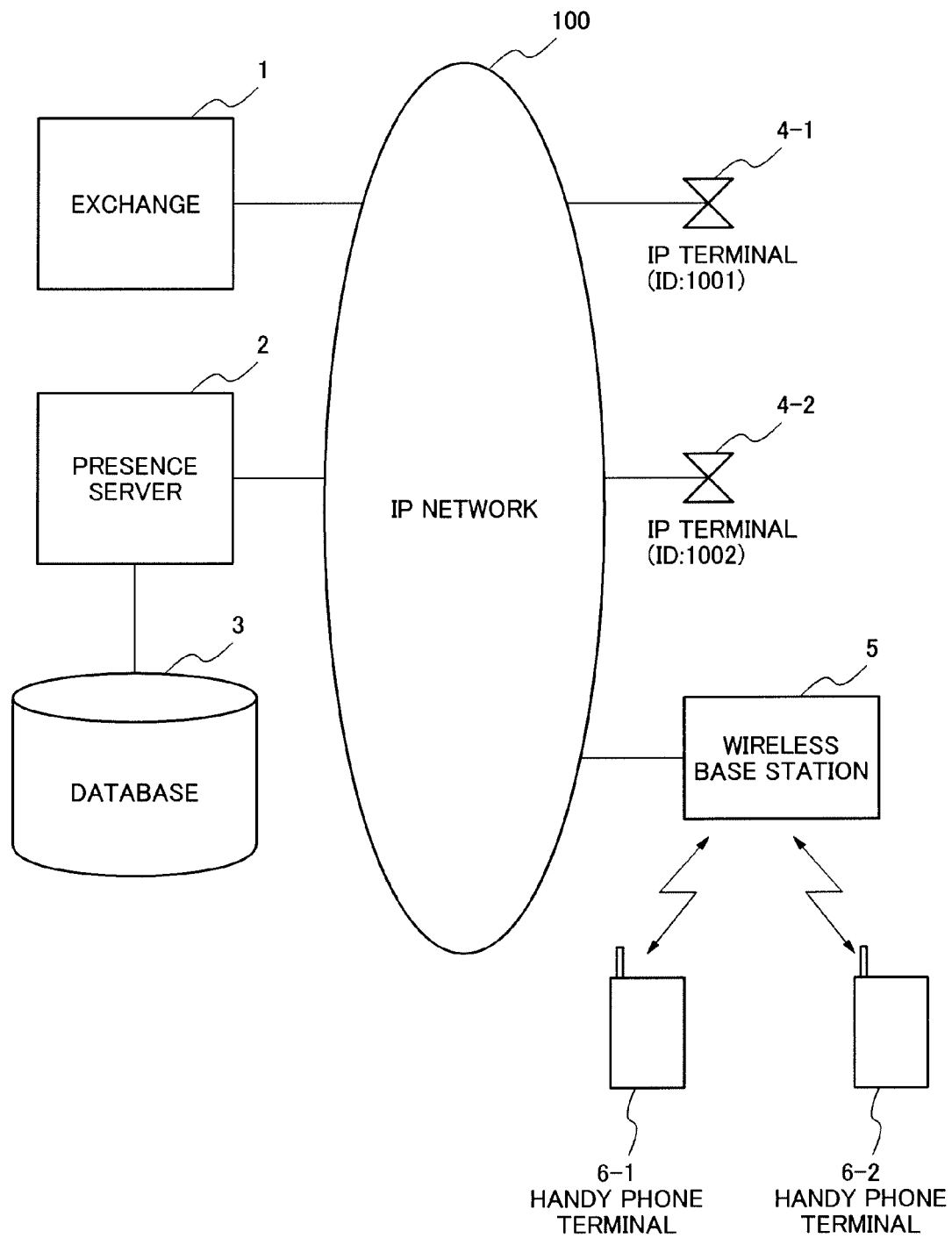
FIG. 1 is a block diagram of a configuration of a communications system according to an embodiment of the present invention.

FIG. 1 is a block diagram of a configuration of a communications system of an exemplary aspect of the present invention. In the communications system of the exemplary aspect of the present invention, a presence server 2 having a database 3, an exchange 1, and IP terminals 4-1, 4-2 such as personal computers (hereinafter called PCs) are interconnected via an IP (Internet Protocol) network 100. A wireless base station 5, which accommodates handy-phone terminals 6-1, 6-2 is also connected to the communications system of the exemplary aspect of the present invention via the IP network 100. The exchange 1 accommodates the IP terminals 4-1, 4-2 and the handy-phone terminals 6-1, 6-2. The exchange 1 performs call-control of the accommodated IP terminals 4-1, 4-2 and handy-phone terminals 6-1, 6-2 as the accommodated telephone terminal via the IP network 100 and the wireless base station 5 to allow a voice call between terminals and between each terminal and an outside terminal.

Figure 2:
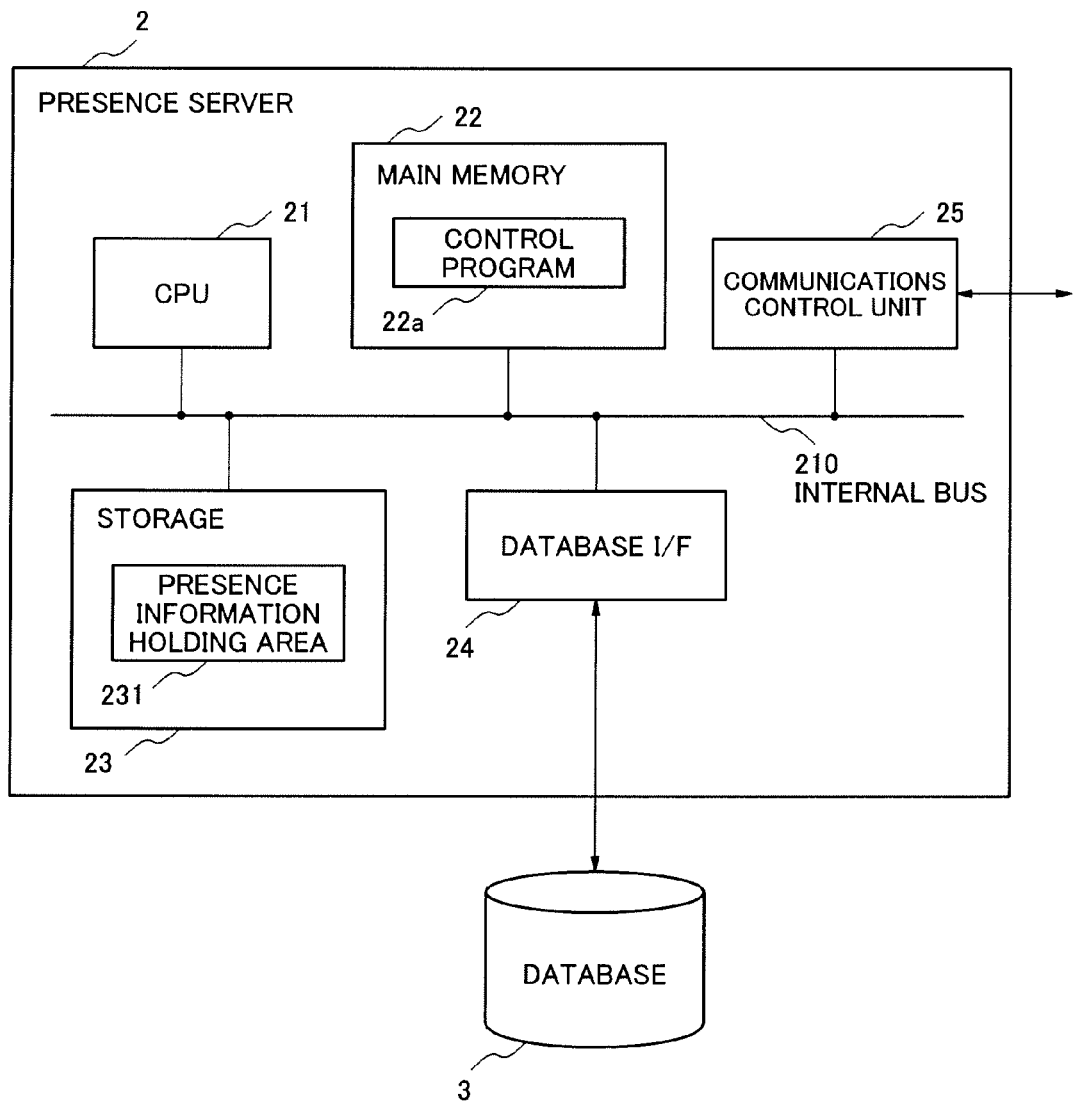
FIG. 2 is a configuration example of a presence server according to an embodiment of the present invention.

FIG. 2 shows a configuration example of the presence server 2 of FIG. 1.

The presence server 2 includes a CPU (central processing unit) 21, a main memory 22, a storage 23, a database I/F (interface) 24, and a communications control unit 25. The CPU 21 executes a control program 22a of the exemplary aspect of the present invention stored in the main memory 22. The storage 23 includes a presence information holding area 231 for holding current presence information of the IP terminal 4-1, 4-2. The presence information holding area 231 is used as a work area when the CPU 21 executes the control program 22a. The database I/F 24 outputs/inputs presence information and the like from/to the database 3. The communications control unit 25 controls communications with each terminal and the exchange 1 via the IP network 100. An internal bus 210 interconnects the CPU 21, the main memory 22, the storage 23, the database I/F 24, and the communications control unit 25.

FIG. 3 shows a configuration of the database 3 depicted in FIG. 1.

For providing a presence service, the database 3 prestores a user ID (identification information), a password, presence information which is defined for each user (user status), a priority level corresponding to presence information, a receiver-priority action, and a caller-priority action.

Each role of the user ID, the presence information, the priority level, the receiver-priority action, and the caller-priority action in the communications system of the exemplary aspect of the present invention will be described below. The password is used for authentication or the like when each user changes information of database 3.

Presence information, a priory level corresponding to the presence information, a receiver-priory action, and a caller-priority action of the database 3 are information corresponding to each user. Information made to be changeable by each user among the above information can be varied depending on operating policies of the communications system.

For example, a set of a combination of priority levels corresponding to presence information can be used in common by users. In other words, all users can use the same combination of priority levels corresponding to presence information. Since a combination of priority levels corresponding to presence information is the same among each user, a priority level given by the presence server based on presence information is equal among each user.

Alternatively, all setting items may be opened to users to be changed. In this case, users can ensure fairness among them by setting priority levels in accordance with common courtesy and sense.

Further, presence information may be set by some kind of user operation or may be automatically obtained by an apparatus which monitors a status of user presence.

FIG. 3 shows data for the IP terminal 4-1 whose user ID is "1001" and the IP terminal 4-2 whose user ID is "1002" as examples.

Regarding the terminal whose user ID is "1001", a password is "1001", and presence information "Attended" corresponds to a priority level "1" wherein a receiver priority action is "reception" and a caller priority action is "reception". The meaning of "reception" is that an incoming call is to a designated terminal by the call. Further, presence information "Absent" corresponds to a priority level "2" wherein a receiver priority action is "notification of being absent using IM (Instant Messaging)", which means that the incoming call is terminated to the IM apparatus to send a notification message to the caller, and a caller priority action is "forwarding to handy-phone terminal 6-1", which means that the incoming call is forwarded and terminated to the handy-phone terminal 6-1. Presence information "Meeting" corresponds to a priority level "3" wherein a receiver priority action is "response message indicating meeting", which means that the incoming call is terminated to a responding apparatus to send a message to the caller for notifying the receiver is present at a meeting, and a caller priority action is "reception". Presence information "Busy by full schedule" corresponds to a priority level "5" wherein a receiver priority action is "forwarding to telephone answering service", which means that the incoming call is forwarded and terminated to a telephone answering service apparatus for sending a message to the caller for notifying the receiver is busy by full schedule and requesting for leaving a message by the caller, and a caller priority action is "reception".

On the other hand, regarding the terminal whose user ID is "1002", a password is "1002", presence information "Attended" corresponds to a priority level "1" wherein a receiver priority action is "reception" and a caller priority action is also "reception". Presence information "Meeting" corresponds to a priority level "3" wherein a receiver priority action is "forwarding to telephone answering service" and a caller priority action is "forwarding to handy-phone terminal 6-2". Presence information "Home" corresponds to a priority level "5" wherein a receiver priority action is "forwarding to telephone answering service" and a caller priority action is "forwarding to home phone", which means that the incoming call is forwarded to the receiver's home and the call is to be terminated to the terminal at the receiver's home. Presence information "Line busy" corresponds to a priority level "6" wherein a receiver priority action is "forwarding to telephone answering service" and a caller priority action is "call waiting", which means that the call waiting service is applied to interrupt the call being used by the caller.

Figure 4:
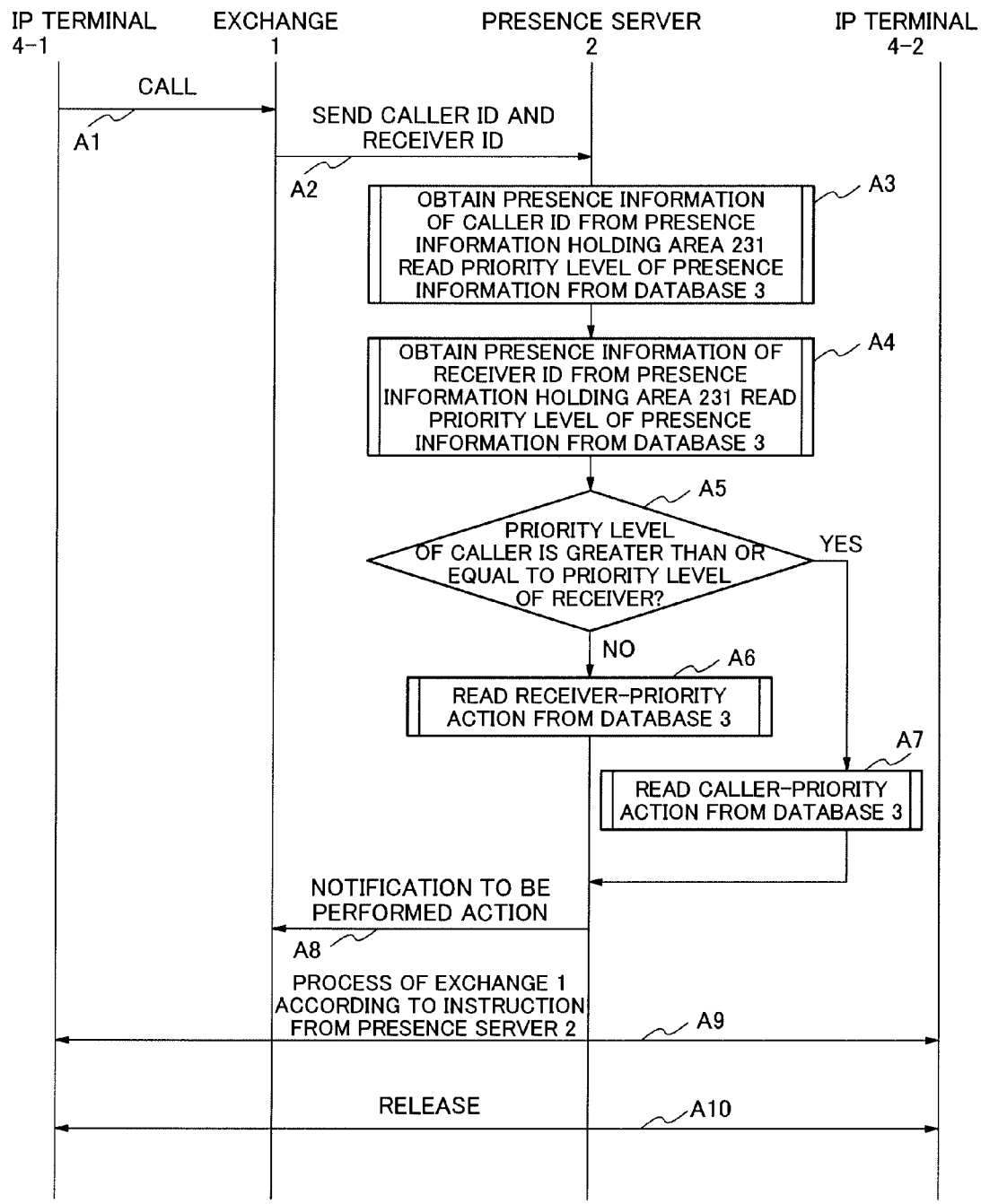
FIG. 4 is a sequence flow of operations of a communications system according to an embodiment of the present invention.

FIG. 4 is a sequence flow of the exemplary aspect of the present invention.

A process of the presence server 2 shown in the sequence flow of FIG. 4 is performed mainly by the control program 22a which runs on the CPU 21.

If the exchange 1 receives a call from the IP terminal 4-1 of a caller (A1) and recognizes that it is an incoming call to the IP terminal 4-2, the exchange 1 sends a caller ID and a receiver ID to the presence server 2 (A2).

When the presence server 2 receives the caller ID and the receiver ID, it obtains presence information corresponding to the caller ID from the presence information holding area 231. The presence server 2 reads a priority level of the caller ID that corresponds to the presence information obtained from the presence information holding area 231, from the database 3 (A3). Similarly, the presence server 2 obtains presence information corresponding to the receiver ID from the presence information holding area 231, and reads a priority level of the receiver ID that corresponds to the obtained presence information, from the database 3 (A4).

The presence server 2 compares the read priority level of the caller with the read priority level of the receiver (A5). If the priority level of the caller is greater than or equal to the priority level of the receiver as the comparison result, the presence server 2 reads a caller-priority action from the database 3 (A7) and instructs the exchange 1 to perform the read action (A8). If the priority level of the receiver is greater than the priority level of the caller, the presence server 2 reads a receiver-priority action from the database 3 (A6) and instructs the exchange 1 to perform the read action (A8).

A case in which the communications system of the exemplary aspect of the present invention operates in the condition of the database contents shown in FIG. 3 will be described along with the sequence of FIG. 4. In the following example, presence information of the IP terminal 4-1 of a caller is "Busy by full schedule" and the IP terminal 4-2 of a receiver is "Meeting". Thus, the presence information holding area 231 of the storage 23 of the presence server 2 holds "Busy by full schedule" as presence information of the IP terminal 4-1 and "Meeting" as presence information of the IP terminal 4-2.

The exchange 1 receives a call from the IP terminal 4-1 (A1) and recognizes that it is an incoming call to the IP terminal 4-2, the exchange 1 sends a caller ID "1001" and a receiver ID "1002" to the presence server 2 (A2).

The presence server 2 obtains presence information "Busy by full schedule" of the caller user ID "1001" from the presence information holding area 231, and reads a priority level "5" corresponding to presence information "Busy by full schedule" of the user ID "1001" from the database 3 (A3). Similarly, the presence server 2 obtains presence information "Meeting" of the receiver user ID "1002" from the presence information holding area 231, and reads a priority level "3" corresponding to presence information "Meeting" of the user ID "1002" from the database 3 (A4). The presence server 2 compares the priority level "5" of the caller (ID 1001) read from the database 3 with the priority level "3" of the receiver (ID 1002) (A5). As a result, the presence server 2 determines that the priority level of the caller is greater than the priority level of the receiver.

The presence server 2 reads the receiver-priority action "forwarding to handy-phone terminal 6-2" of the receiver (ID 1002) from the database 3 (A7). The presence server 2 instructs the exchange 1 to perform call processing for the receiving action "forwarding to handy-phone terminal 6-2" read from the database 3 (A8).

When the exchange 1 receives the instruction from the presence server 2, it forwards the incoming call, which is originated from the IP terminal 4-1 and supposed to be terminated to the IP terminal 4-2, to the handy-phone terminal 6-2 (A9). Thus, the exchange 1 sends a ringing signal to the handy-phone terminal 6-2 and connects the IP terminal 4-1 with the handy-phone terminal 6-2, thereby allowing a call between them (A9).

As described above, in the exemplary aspect of the present invention, situations of a caller and a receiver are converted into numerical values and compared so that an optimum receiving action is determined and selected in view of both situations.

Additionally, as previously described, the presence server 2 of the exemplary aspect of the present invention controls the exchange 1 based on information that is set for each user in the database 3. Therefore, more flexible processing is allowed by changing a setting of the database 3 in various manners.

If a user can modify information of the database 3 easily, the convenience of the user is enhanced. For example, a user interface which allows a user to modify information of the database 3 from outside user's office may be provided. This can be realized by the communication control unit 25 in the presence server 2. The communication control unit 25 accepts an access operation for modifying any of contents of the current presence status maintained in the presence information holding area 231 and the presence information stored in the database 3, and the CPU 21 of the presence server 2 performs this modification by running the control program 22*a*. By doing so, a user whose schedule of business trip has been changed can modify contents of the database 3 from anywhere while traveling, and thereby presence information (e.g. "business trip") and a caller-priority action corresponding to the presence information "business trip" can be modified. For example, if the business trip schedule has been changed and a user wants to receive important calls at a travel location, the user can modifies the presence information to "business trip" and corresponding caller-priority action to "forwarding to a telephone at the travel location". By doing this modification in contents of the database 3, the user can receive the call, which has higher priority level than the presence information of "business trip", by the telephone at the travel location.

Further, the presence information of caller may be specified by the caller when the caller originates the call. This can be realized by using predetermined code transmitted by the caller. The predetermined code specifies the presence status and the priority level as the presence information of the caller, and the presence server 2 receives this code from the exchange 1 which has received the incoming call. The presence server 2 converts this code into predetermined presence status and corresponding priority level, then reads priority level of the presence information corresponding to the receiver from the database in accordance with current presence status of the receiver, and obtains, from the database 3, one of the caller-priority action and the receiver-priority action depending on the respective priority levels.

In the above description of the exemplary aspect of the present invention, a user ID belongs to a terminal. However, a user ID may belong to a user (person) instead of a terminal so that the user ID is portable regardless of a terminal. Thereby, when such a user ID is used, a service for switching a call receiving processing corresponding to presence information can be performed in the same setting even if any terminal is used.

The exemplary aspect of the present invention has the following advantages.

Firstly, in the exemplary aspect of the present invention, it is possible to switch a call receiving processing corresponding to both presence information of a receiver and a caller.

Secondly, it is necessary for a user to perform two kinds of operation in a conventional PBX to allow plural types of call receiving processing depending on a situation of the user as a receiver. One is an operation for specifying a necessary call receiving processing corresponding to a specific situation at each time required, and the other is an operation for activation that the switching of call receiving processing is effective.

On the other hand, in the exemplary aspect of the present invention, only if a call receiving processing corresponding to various situations of a user is set once, the user has only to perform an operation for changing presence information. The presence server of the exemplary aspect of the present invention performs a control operation for switching to an optimum call receiving processing corresponding to presence information of the user. Therefore, if presence information is changed, an optimum call receiving processing corresponding to the changed presence information is effective from that time point. Furthermore, when presence information is automatically obtained by some other means, the operation itself for changing presence information is not required for the user. In any case, the exemplary aspect of the present invention has an advantage of reducing operations performed by the user.

Figure 5:
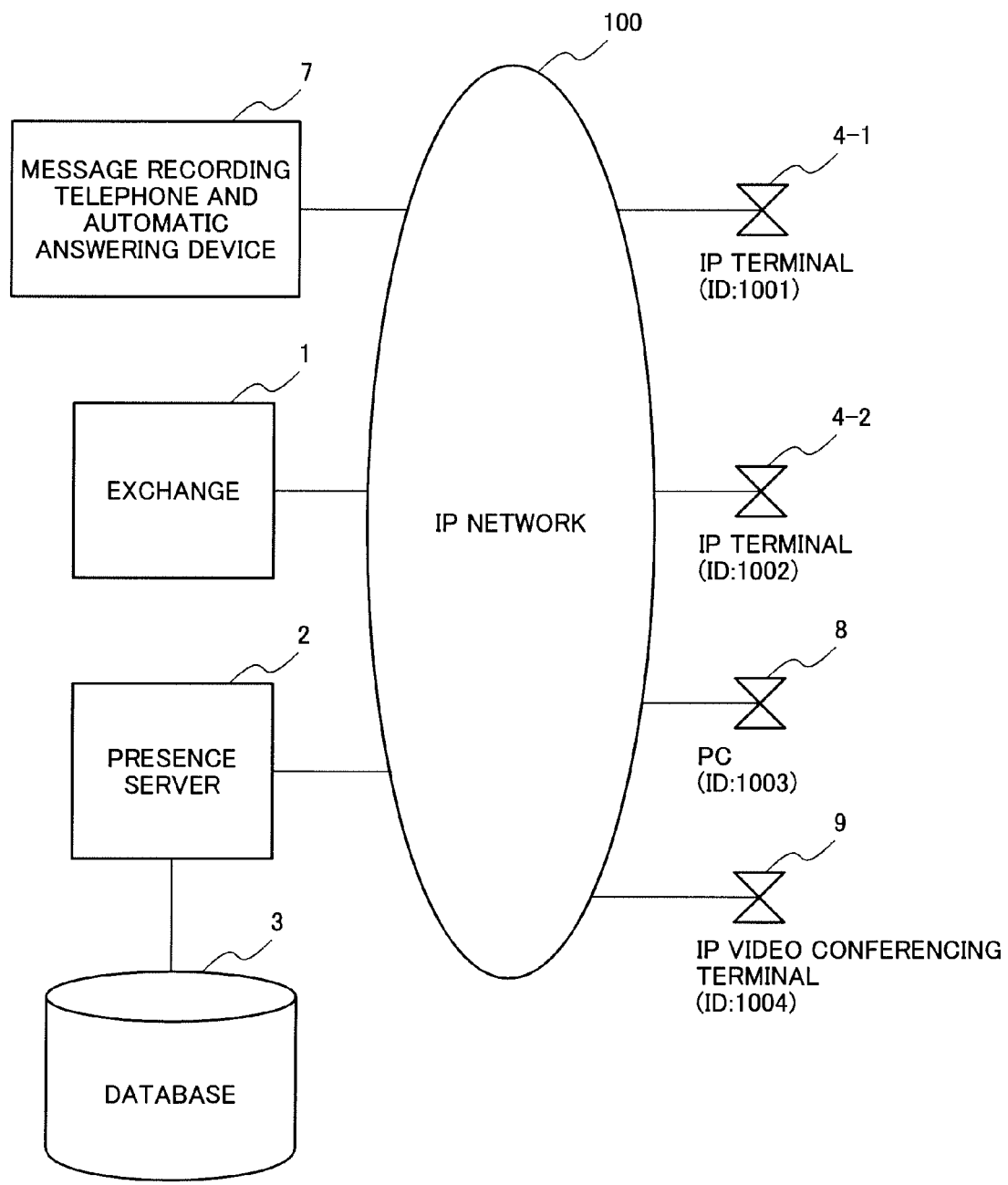
FIG. 5 is a block diagram of an alternative configuration (1) of a communications system according to an embodiment of the present invention.

FIG. 5 shows another configuration of the communications system according to the exemplary aspect of the present invention. When FIG. 5 is compared with FIG. 1, the handy-phone terminals 6-1 and 6-2 are replaced with a PC 8 and an IP video conferencing terminal 9. In addition, a message recording telephone and automatic answering device 7 is connected to the IP network 100. For the rest, FIG. 5 has a similar configuration to that of FIG. 1. A component corresponding to a component of FIG. 1 has the same reference numerical as in FIG. 1.

The message recording telephone and automatic answering device 7 performs transmitting a recorded voice message to a caller and recording a voice message from the caller on behalf of the exchange 1. On the PC 8 and the IP video conferencing terminal 9, a software for implementing an IP phone, a software for implementing a chat of audio and video, a software for implementing an IP video conferencing run. Even if the communications system according to the exemplary aspect of the present invention uses the devices shown in FIG. 5, the communications system operates in a similar way as in the above described exemplary aspect of the present invention.

Figure 6:
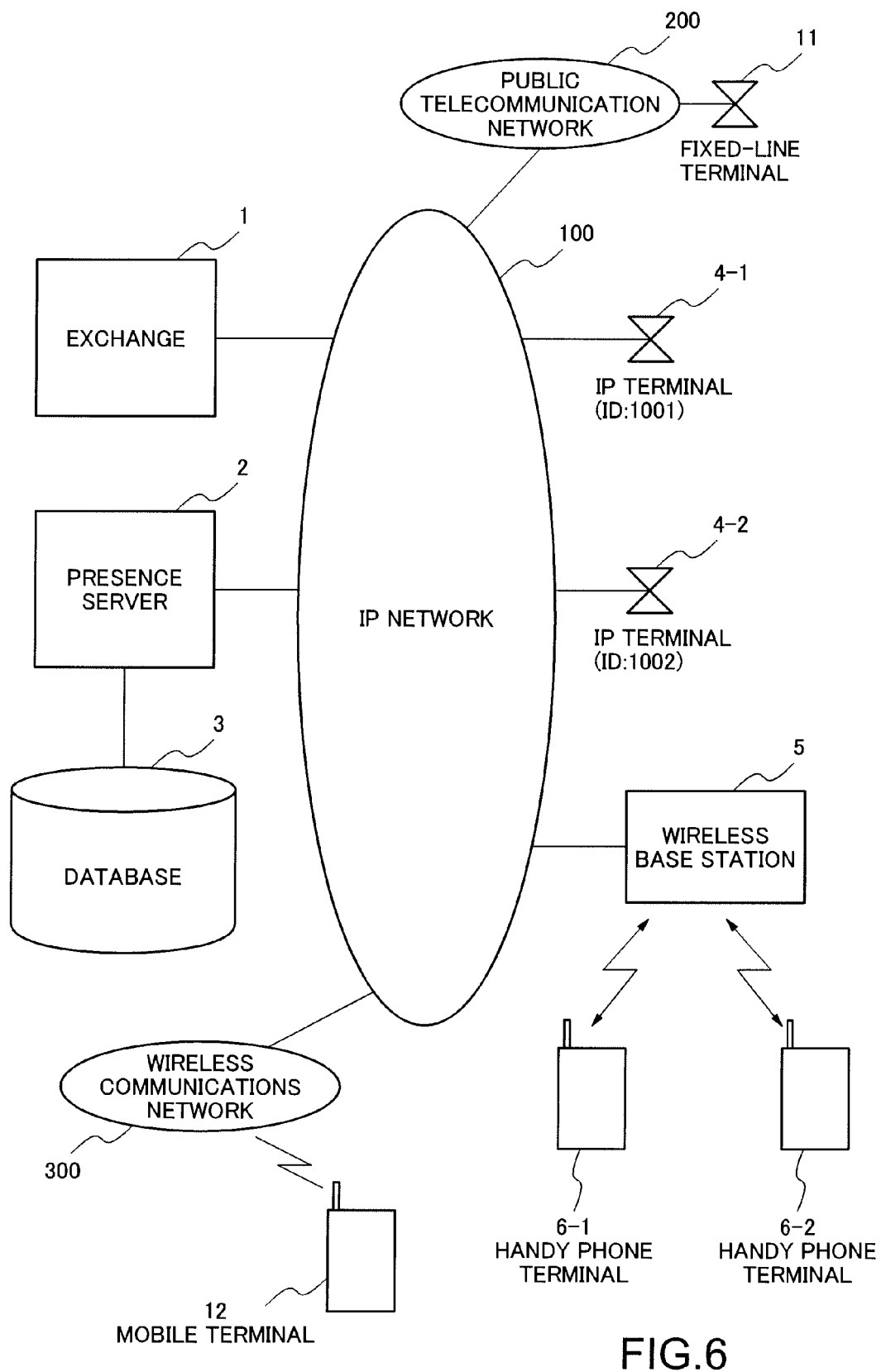
FIG. 6 is a block diagram of an alternative configuration (2) of a communications system according to an embodiment of the present invention.

FIG. 6 is a block diagram which shows a further additional configuration of the communications system according to the exemplary aspect of the present invention. In FIG. 6, a public telecommunication network 200 and a wireless communications network 300 are connected to the IP network 100. For the rest, FIG. 6 has a similar configuration to that of FIG. 1. A component corresponding to a component of FIG. 1 has the same reference numerical as in FIG. 1. The IP terminals 4-1, 4-2 and the handy-phone terminals 6-1, 6-2 communicate with a fixed terminal (telephone set or the like) 11 or a mobile terminal (handy-phone terminal or the like) 12 via the public telecommunication network 200 or the wireless communications network 300.

When the communications system according to the exemplary aspect of the present invention has the configuration shown in FIG. 6, information corresponding to the fixed-line terminal 11 and the mobile terminal 12 has to be added to information of the above described database 3. Information corresponding to the fixed-line terminal 11 or the mobile terminal 12 is an ID, a password, presence, a priority level corresponding to the presence, a receiver-priority action, and a caller-priority action of a user of the fixed-line terminal 11 or the mobile terminal 12 respectively. These items may be added in a way that they correspond to each of terminals such as the fixed terminal-line 11 and the mobile terminal 12 individually, or may be added in a way that they correspond commonly to a terminal to be connected to the exchange 1 of an external line through the IP network of the communications system according to the exemplary aspect of the present invention. Presence information of the fixed-line terminal 11 or the mobile terminal 12 may be preset and changed from the fixed-line terminal 11 or the mobile terminal 12 through the communication control unit 25 in the presence server which accepts an access operation for modifying presence information, or may be specified by a user as required and transmitted from the fixed-line terminal 11 or the mobile terminal 12 when a call is originated to a terminal of the communications system according to the exemplary aspect of the present invention. In this case, predetermined code which specifies the presence status and the priority level as the presence information of the caller can be used, and the presence server 2 converts this code into predetermined presence status and corresponding priority level for its control operation. Also regarding an external line connection, the communications system according to the exemplary aspect of the present invention operates in a similar way as in the above described exemplary aspect of the present invention, by adding appropriate information to the database 3.

Although the presence server 2 and the exchange 1 are individual apparatuses in the foregoing description, each function of the communications system according to the exemplary aspect of the present invention may be implemented in various configurations. For example, the presence server may be integrated with the exchange 1. In other words, a function of the presence server 2 may be implemented as a part of a function of a hardware or a software of the exchange 1. Further, the exchange 1, a function of the presence server 2 for controlling the exchange 1, and the other functions of the presence server 2 may be implemented in separate apparatuses respectively.

Further, a relation between the exchange 1 and the presence server 2 may be one-to-one, one-to-many, or many-to-many relation. Therefore, the communications system according to the exemplary aspect of the present invention may include one presence server 2 and a plurality of exchanges 1, a plurality of presence servers 2 and one exchange 1, or a plurality of presence servers 2 and a plurality of exchanges 1.

It is needless to say that a wireless LAN, a WAN, and other networks other than the IP network shown in FIGS. 1, 5, and 6 may also be used in the communications system according to the exemplary aspect of the present invention.

As described above, examples of call receiving processing of the communications system according to the exemplary aspect of the present invention are "reception", "notification using IM", "voice message response", "forwarding to telephone answering service", "forwarding (to handy-phone terminal or specified phone in home), and "call waiting". However, call receiving processing of the communications system according to the exemplary aspect of the present invention are not limited to these call receiving processing and may be other various call receiving processing. For example, a call receiving processing using a function of a PDA, a FAX, and an IP telephone can be applied.

Further, as a call receiving processing, a function for displaying information from an exchange on a terminal may be used. For example, a receiving terminal may be notified of caller's presence information from the exchange 1, and the presence information may be displayed on the terminal using a function of the terminal for displaying information.

An example of a case that a receiving terminal is notified of caller's presence information and the presence information is displayed on the terminal will be described specifically.

Information of "display caller's presence information" is specified as a content of receiver-priority action corresponding to presence information "Busy by full schedule". When the receiver's presence information is "Busy by full schedule", the terminal of the receiver displays the caller's presence information if there is an incoming call from a caller whose priority level of presence information is lower than the receiver's priority level. Even when the receiver is "Busy by full schedule", the receiver can select decision whether or not to take the phone with reference to the displayed caller's present information. For example, if the caller's presence information is meeting, the receiver guesses that the caller is requiring information necessary for a discussion in the meeting. In this way, the receiver can select whether or not to reply to a relevant incoming by obtaining information about the caller's presence information and determining importance of a business of the caller. Furthermore, additional process may be added to the sequence shown in FIG. 4 to display receiver's presence information on a terminal of a caller. By displaying receiver's presence information on a terminal of a caller, the caller can recognize current situation of the receiver more specifically.

In a further example, aside from an action at a time of call reception, the presence server 2 may include a "presence information change action" that acts when information of presence information of the database 3 is changed. For example, by setting a presence change action to "send IM to specified party" when presence information is changed from "Absent" to "Going out", a specified party is notified by IM that a user is going out when the user presence information is changed from "Absent" to "Going out".

As described above, user presence information of each terminal stored in database 3 may be set by user operation of each user or may be automatically obtained by some other means. The presence server 2 may include a function which reads status information which is set in an exchange by a terminal and automatically sets corresponding presence information in the database 3. For example, to use a call transfer function for an absent user of the exchange 1, a user is assumed to operate the terminal 4-1 to set "start call transfer" in the exchange 1. The presence server 2 reads settings of the exchange 1 corresponding to each of terminals including the terminal 4-1. The presence server 2 reflects the settings of the exchange 1 corresponding to each terminal on the database 3. For example, for the setting "start call transfer" of the terminal 4-1, "Absent" is set in presence information of the terminal 4-1 of the database 3. By these functions of the presence server 2 of the present invention, a communications system using presence information as described above according to the exemplary aspect of the present invention can be established even though a PBX and terminals, which only conform to conventional call forwarding function but do not conform to call forwarding function using presence information of users, are used in the communications system.

This application is based on Japanese Patent Application No. JP 2005-filed on Jun. 10, 2005, and including a 266176 specification, claims, drawings and summary. The disclosure of the above Japanese Patent Application is incorporated herein by reference in its entirety.

What is claimed is:

1. A communications system including a plurality of communication terminals, each connected to a network, the communications system comprising:
    an exchange, connected to the network, which performs call connection processing for a communication terminal;
    a presence server, connected to the network, which maintains presence information that includes a priority level and indicates a presence status set to each communication terminal,
    wherein when an incoming call to the communication terminal is performed, the exchange instructs the presence server to obtain control information,
    and in response to the instructions from the exchange, the presence server extracts and compares receiver-priority action which is predefined for a case that the priority level of the presence information corresponding to the receiver side communication terminal is higher than that of the caller side communication terminal, and caller-priority action which is predefined for a case that the priority level of the presence information corresponding to the caller side communication terminal is higher than or equal to that of the receiver side communication terminal, depending on the priority levels of the presence information corresponding to respective communication terminals concerned for the call being processed, and the exchange performs different call connection processing depending on the receiver-priority action and the caller-priority action obtained by the presence server; and
    a database, connected to the presence server and stores the presence information which is defined for each communication terminal and indicates a plurality of presence statuses set to each communication terminal, each presence status is associated with a priority level which is a numerical value converted from the presence status corresponding to the presence information, the receiver-priority action that is performed to control the exchange in the case that the priority level of the presence information corresponding to the receiver side communication terminal is higher than that of the caller side communication terminal, and the caller-priority action that is performed to control the exchange in the case that the priority level of the presence information corresponding to the caller side communication terminal is higher than or equal to that of the receiver side communication terminal,
    wherein the presence server reads respective priority levels of the presence information corresponding to each communication terminal concerned for the call from the database in accordance with current presence status of each communication terminal, and extracts, from the database, the receiver-priority action and the caller-priority action depending on the priority levels having been read.

2. The communications system according to claim 1, wherein the presence server further comprises:
    a presence information holding means, which maintains current presence status of each communication terminal,
    wherein the current presence status is updated either by user operation or presence server operation which reflects settings in the exchange corresponding to the communication terminal.

3. The communications system according to claim 2, wherein the presence server further comprising;
    a communication control unit, which accepts an access operation for modifying any of contents of the current presence status maintained in the presence information holding means and the presence information stored in the database.

4. The communications system according to claim 1, wherein the communication terminal includes a display means, and the receiver-priority action includes a control operation to indicate the current present status corresponding to the caller side communication terminal.

5. The communications system according to claim 1, wherein the caller side communication terminal transmits a predetermined code for specifying the presence status and the priority level as the presence information of the caller side communication terminal, and the presence server reads priority level of the presence information corresponding to the receiver side communication terminal from the database in accordance with current presence status of the receiver side communication terminal, and extracts, from the database, one of the receiver-priority action and the caller-priority action depending on the respective priority levels.

6. The communications system according to claim 1, wherein the database includes the presence information corresponding to communication terminals belonging to other networks.

7. A communications method for a communications system including a plurality of communication terminals, each connected to a network, an exchange connected to the network which performs call connection processing for a communication terminal, and a presence server connected to the network which maintains presence information that indicates a presence status set to each communication terminal, the communications method comprising:
   an instructing step by the exchange for instructing the presence server to obtain control information when an incoming call to the communication terminal is performed;
   an extracting step by the presence server for extracting and comparing receiver-priority action which is predefined for a case that the priority level of the presence information corresponding to the receiver side communication terminal is higher than that of the caller side communication terminal, and caller-priority action which is predefined for a case that the priority level of the presence information corresponding to the caller side communication terminal is higher than or equal to that of the receiver side communication terminal, depending on the priority levels of the presence information corresponding to respective communication terminals concerned for the call being processed;
   a performing step by the exchange for performing different call connection processing depending on the receiver-priority action and the caller-priority action obtained at the extracting step; and
   a storing step for storing the presence information to a database connected to the presence server where the presence information which is defined for each communication terminal and indicates a plurality of presence statuses set to each communication terminal, each presence status is associated with a priority level which is a numerical value converted from the presence status corresponding to the presence information, the receiver-priority action that is performed to control the exchange in the case that the priority level of the presence information corresponding to the receiver side communication terminal is higher than that of the caller side communication terminal, and the caller-priority action that is performed to control the exchange in the case that the priority level of the presence information corresponding to the caller side communication terminal is higher than or equal to that of the receiver side communication terminal; and the extracting step further includes
   a reading step by the presence server for reading respective priority levels of the presence information corresponding to each communication terminal concerned for the call from the database in accordance with current presence status of each communication terminal, and extracting, from the database, the receiver-priority action and the caller-priority action depending on the priority levels having been read.

8. The communications method according to claim 7 further comprising:
   a holding step by the presence server for holding presence information which maintains current presence status of each communication terminal, and
   a updating step for updating the current presence status by user operation or by the presence server operation of reflecting settings in the exchange corresponding to the communication terminal.

9. The communications method according to claim 8, further comprising:
   an accepting step at the presence server for accepting access operation to modify any of contents of the current presence status maintained in the presence information holding step and the presence information stored in the database.

10. The communications method according to claim 7, wherein
   the extracting step includes an extracting indication operation step for extracting the receiver-priority action including a control operation to indicate the current present status corresponding to the caller side communication terminal.

11. The communications method according to claim 7 further comprising:
   a status transmitting step at the caller side communication terminal for transmitting a predetermined code for specifying the presence status and the priority level as the presence information of the caller side communication terminal; and the extracting step further includes
   a reading step by the presence server for reading priority level of the presence information corresponding to the receiver side communication terminal from the database in accordance with current presence status of the receiver side communication terminal, and extracting, from the database, one of the receiver-priority action and the caller-priority action depending on the respective priority levels.

12. The communications method according to claim 7, wherein the storing step further includes a step for storing the presence information corresponding to communication terminals belonging to other networks.

13. A presence server for a communications system including a plurality of communication terminals, each connected to a network, an exchange, connected to the network, which performs call connection processing for a communication terminal, the presence server comprising:
   a storage device which maintains presence information that indicates a presence status set to each communication terminal;
   a control device which extracts and sends to the exchange control information of the exchange based on both presence information corresponding to a caller side communication terminal and a receiver side communication terminal when instructed by the exchange which performs different call connection processing depending on receiver-priority action and caller-priority action sent from the presence server,
   wherein the presence information includes a priority level, and the control unit extracts and compares the receiver-priority action which is predefined for a case that the priority level of the presence information corresponding to the receiver side communication terminal is higher than that of the caller side communication terminal, and the caller-priority action which is predefined for a case that the priority level of the presence information corresponding to the caller side communication terminal is higher than or equal to that of the receiver side communication terminal, depending on the priority levels of the presence information corresponding to respective communication terminals concerned for the call being processed by the exchange; and a interface device to a database which stores the presence information which is defined for each communication terminal and indicates a plurality of presence statuses set to each communication terminal, each presence status is associated with a priority level which is a numerical value converted from the presence status corresponding to the presence information, the receiver-priority action that is performed to control the exchange in the case that the priority level of the presence information corresponding to the receiver side communication terminal is higher than that of the caller side communication terminal, and the caller-priority action that is performed to control the exchange in the case that the priority level of the presence information corresponding to the caller side communication terminal is higher than or equal to that of the receiver side communication terminal, wherein the control unit reads respective priority levels of the presence information corresponding to each communication terminal concerned for the call from the database via the interface unit in accordance with current presence status of each communication terminal, and extracts, from the database, the receiver-priority action and the caller-priority action depending on the priority levels having been read.

14. The presence server according to claim 13 further comprising;

a presence information holding means, which maintains current presence status of each communication terminal, wherein the current presence status is updated either by user operation or presence server operation which reflects settings in the exchange corresponding to the communication terminal.

15. The presence server according to claim 13, wherein the receiver-priority action includes a control operation to indicate the current present status corresponding to the caller side communication terminal.

16. The presence server according to claim 13, where in the control unit receives a predetermined code for specifying the presence status from the caller side communication terminal and the priority level as the presence information of the caller side communication terminal, and reads priority level of the presence information corresponding to the receiver side communication terminal from the database in accordance with current presence status of the receiver side communication terminal, and extracts, from the database, one of the receiver-priority action and the caller-priority action depending on the respective priority levels.

17. The communications system according to claim 13, wherein the control unit extracts the presence information corresponding to communication terminals belonging to other networks stored in the database.

18. The presence server according to claim 17, wherein the communication control unit accepts an access operation for modifying any of contents of the current presence status maintained in the presence information holding means and the presence information stored in the database.

* * * * *